March 14, 1950 R. F. LANDWEHR Re. 23,207

LIGHTER

Original Filed Dec. 19, 1945 2 Sheets-Sheet 1

INVENTOR
Richard F. Landwehr
BY
ATTORNEY 45-159

March 14, 1950 R. F. LANDWEHR Re. 23,207

LIGHTER

Original Filed Dec. 19, 1945 2 Sheets-Sheet 2

INVENTOR
Richard F. Landwehr
BY
William R. Bluck
ATTORNEY 45-159

Reissued Mar. 14, 1950

Re. 23,207

UNITED STATES PATENT OFFICE 23,207

LIGHTER

Richard F. Landwehr, Laurelton, N. Y., assignor to American Safety Razor Corporation, Brooklyn, N. Y., a corporation of Virginia Original No. 2,461,329, dated February 8, 1949, Serial No. 635,847, December 19, 1945. Application for reissue April 30, 1949, Serial No. 90,684

5 Claims. (Cl. 67—7.1)

Matter enclosed in heavy brackets [ ] appears in the original patent but forms no part of this reissue specification; matter printed in italics indicates the additions made by reissue

[My present invention relates to improvements in lighters adapted for lighting cigars and cigarettes, and aims primarily to provide a novel and advantageous lighter having special features of construction whereby assembly and disassembly of the parts are facilitated and the operation of the device is advantageous in comparison with the operation of lighters heretofore in use.]

[A further object of the invention is to provide a lighter wherein substantially all of the casing and operating parts are held together by a single pivot pin.]

[Another object of the invention is to provide a lighter wherein a close fit is maintained at all times between the rear portion of cover and the outer casing at the rear and sides of the opening closed by the cones.]

*This invention relates to cigarette lighters and, more particularly, to lighters of the general type having a cover or snuffer cap pivoted at a point above, and in substantial alignment with, the flint tube and completely housing the igniting mechanism conveniently mounted on its pivot pin, said snuffer cap serving as a single pivoted member for actuating the mechanism; for this purpose, the cap is normally latched against the urgency of a spring so that when the latch is released, the cap in turning to open position actuates the igniter mechanism to ignite the now exposed wick.*

*The objects of the present invention are best explained with reference to a cigarette lighter of the type described which has been on the market for many years. This prior lighter has a snuffer cap or cover which occupies the entire width of the lighter, being pivoted at the rear, to a pair of up-turned ears which project upwardly from the top wall of the fuel tank. It should be explained that the fuel tank of said prior art lighter is contained within a hollow body which constitutes an outer casing therefor. The top edges of the side walls of the outer casing at the rear are provided with substantially semi-circular cut-outs, within which are received the side walls of the snuffer cap, which are substantially circular to conform to the curvature of the said cut-outs of the outer casing. This prior art lighter is characterized by the circumstances that the said top wall of the fuel tank extends above the said top edges of the outer casing, and that said top wall of the fuel tank slopes downwardly from front portion through which the wick protrudes to rear where the flint protrudes.*

*One of the objects of the instant invention is to provide a novel re-arrangement of said type of prior art lighters wherein the snuffer cap or cover will not occupy the entire width of the lighter but will be foreshortened both from the rear, and from the front, walls. In this way, the flame is kept at a safe distance from the front wall (to avoid burning the thumb of the user in opening the lighter) and, from the rear wall of the lighter (to avoid the possibility of the cover striking the finger when it snaps open).*

*Another object of the instant invention is to provide in the aforesaid foreshortened cap lighter an arrangement wherein the top wall of the fuel tank will not slope downward from front to rear (as in the afore-described prior art lighter), but wherein the rear portion of said wall will be, on the contrary, higher than at the front wall. In this way, any fuel leaking from the wick (which is at the front of the lighter) will be kept away from the elevated flint (which is at the rear of the lighter, aligned with the pivot pin of the cap).*

*To attain the foregoing objects (and other objects which will be pointed out below) I have improved upon the structural arrangement of the aforesaid prior art lighter in the following manner: As pointed out above, the top wall of the fuel tank in the said prior art lighter extends above the top edges of the outer casing; in the improved lighter of the invention, on the other hand, the top wall of the fuel tank is a considerable distance below the top edges of the outer casing.*

*A further object or reason for so locating the top wall of the fuel tank below the edge of the side walls is to provide space between the top edges of the outer casing and the top wall of the fuel tank, for the latch mechanism for which no accommodation had to be made in the aforementioned prior art lighter because of the fact that the latch mechanism was disposed exteriorly of the lighter casing. This provision attains the further objective of permitting the use of a cap of minimum height.*

*In the aforesaid prior art lighter, the rear end of the cover is open between its pair of parallel side walls, and the said portion of the rear wall of the outer casing which, as before-mentioned, extends above the top edges of the side walls, is of arcuate shape to occupy the said space between the side walls of the cover. Another object of the instant invention is to improve upon this construction, which is not satisfactory because of the difficulty of producing a sufficiently close fit and tolerance between the two interfitting parts. The improved lighter of this invention obviates this difficulty by providing a closure at the end portion of the cover which is in sliding engagement with said raised portion of the rear wall of the lighter.*

*The attainment of objectives in the paragraph preceding introduces, however, a problem concerned with the extent of opening of the cover. This extent of opening must be at least 90° so as to fully expose the wick. This extent of full opening is difficult to attain by reason of the presence of the flint tube, which is in underlying relation to, and in substantial alignment with, the pivot pin of the cover. Accordingly, a further object of this invention is to provide a cover of the type described which will have an extent of opening 90° or more.*

For the attainment of these objects and such other objects, features and advantages as may hereafter appear or be pointed out, I have illustrated an embodiment of my invention wherein.

Figure 1:
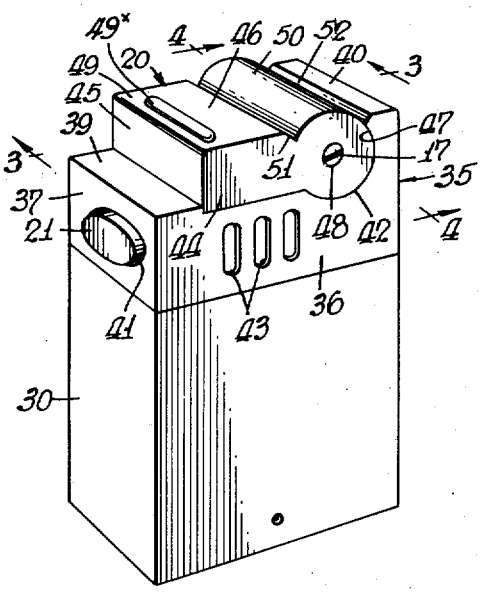
Fig. 1 is a perspective view of a fully assembled lighter with its cover latched in closed position.
Figure 2:
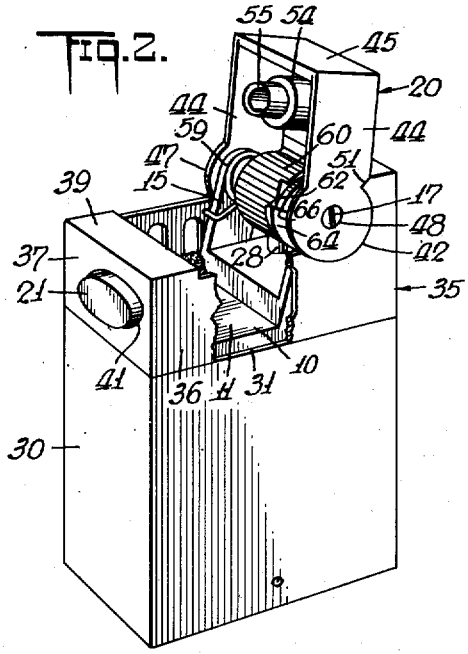
Fig. 2 is a similar view with the cover unlatched and held in raised position by its spring.
Figure 3:
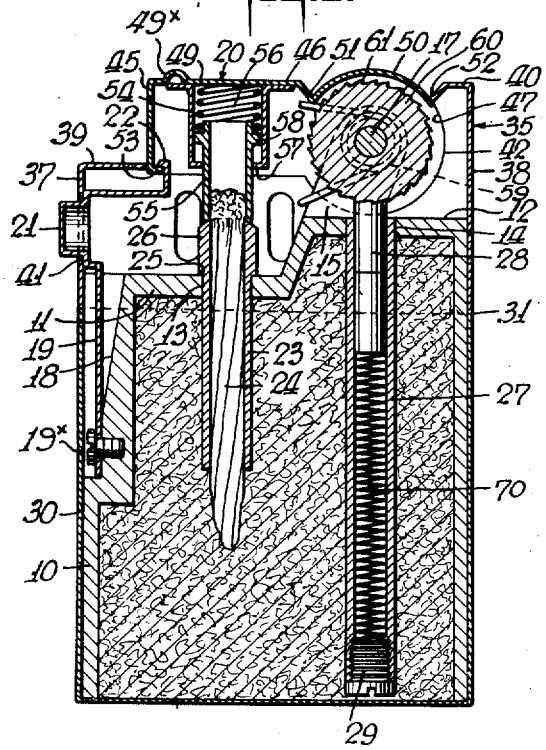
Fig. 3 is a vertical section on line 3—3 of Fig. 1.

Referring to the drawings, the lighter comprises a fuel tank 10, preferably of oblong horizontal cross-section. This fuel tank is open at the bottom and closed at the top by front and rear top wall portions 11 and 12 stepped upwardly from front to rear with an upwardly and rearwardly inclined connecting wall. The front top wall portion 11 is provided with an opening 13 preferably located midway between the sides of the fuel tank and the rear top wall portion is provided with an opening 14. Rearwardly inclined arms 15 extend upwardly from opposite side walls of the fuel tank and have registering or axially aligned openings 16 to receive a pivot pin 17 vertically above said opening 14.

In the front wall of said fuel tank 10 is a depression 18 whose depth increases upwardly and in which is received part of a leaf spring locking latch 19 for a cover or snuffer cap 20. The lower end of said latch 19 is secured by headed screws 19x to the front wall of the fuel tank at the lower end of said depression. Above the top wall portion 11 extends the upper part of latch 19 which is provided with a forwardly projecting protuberance 21 adapted to serve as a push button. The upper end of said latch 19 has a forwardly extending locking or latching projection 22.

A wick tube 23 having a wick 24 therein is dropped through opening 13 in top wall portion 11 to seat a shoulder 25 at the lower end of an enlarged head 26, on the upper surface of top wall portion 11. A flint tube 27 closed at the bottom by screw threaded closure member 29, is force-fitted in opening 14. The flint 28 is elevated in the tube by spring 70 into engagement with the flint wheel as will shortly be pointed out. Due to the higher level of top wall portion 12, fuel escaping from the wick will not reach the top of the flint tube or operating means above the same.

The lower part of fuel tank 10 fits closely in the open top of an outer casing 30 closed at its bottom and of less height than the fuel tank. The fuel tank 10 when snugly nested in the outer casing will extend above the upper edge thereof. Telescoped on the upper part of the fuel tank 10 is an intermediate casing 35, which is a hollow shell of oblong cross-section, open at the top as well as at the bottom and of approximately the same internal and external width and length in cross-section as the outer casing 30 and is seated on the top edge thereof. Said intermediate casing thus forms a continuation or extension of the outer casing 30.

Said intermediate casing 35 comprises sides 36, front and rear walls 37 and 38 respectively, a bridge piece 39 across the top at the front and a bridge piece 40 across the top at the rear and at a higher level or elevation. In the front wall 37 there is an opening 41 through which the push button 21 can pass. At their rear portions the sides or side walls have curved top edge portions 42 in the forms of circular arcs about an a axis substantially the same as that of openings 16 in arms 15. At their front ends said sides 36 are provided for ventilation purposes with openings 43 preferably in the form of vertical slots.

Above the intermediate casing 35 is the cover proper 20 comprising side walls 44, front wall 45 and top wall 46. The rear portions of said side walls 44 are bounded by edges 47 in the form of circular arcs concentric with central openings 48 and 48a in said rear portions of the right side wall and the left side wall respectively, and the two openings are in axial alignment with each other although opening 48a is of smaller diameter and internally screw threaded. The radii of said circular arc edges 47 are equal and substantially the same as the radii of the curved top edge portions 42 of the intermediate casing 35. The top wall 46 comprises a front portion 49 which may be flat and a rear portion 50 curved to the same radius as the outer edges 47 of the rear portion of said side walls. Top surface 49 is provided with a ridge 49x to serve as a finger-piece to facilitate closing of the cover.

The two top wall portions 49 and 50 are separated by a depression 51 of V-shaped cross-section. When the cover 20 is closed, the rear edge of the curved rear portion 50 of the cover is just inside the edge of the downwardly inclined forward edge portion 52 of the bridge piece 40 of the intermediate casing 35. Projection or flange 53 at the inner face of the front wall 45 constitutes a latch element to be engaged at its upper surface by projection 22 of the latch 19. The lower edge of the front wall 45 of the cover when the latter is closed, is located just behind the rear edge of the bridge piece 39.

For foreshortening the cap, the intermediate casing 35 is provided as a separate member. This simplifies manufacture and assembly of the parts and also incorporates the following features: The curvature of the top edge portions 42 of the intermediate member and the corresponding curvature of the rear portions of the side walls 44 of the cover closes the casings at the sides for all positions of the cap. The cooperation of the correspondingly curved rear portion 50 of the top of the cover with the inner surface of the bridge piece 40 closes the top of the casing at the rear in all positions of the cover. Such cooperating curvatures therefore keep the upper parts of the casing closed at the sides and back.

The bearing for the swinging movement of the cap or cover 20 is not actually the pivot pin 17, but comprises the curved edges 47 of the rear portions of the side walls 44 of the cover and the curved portions 42 at the upper edges of the side walls 44 of the intermediate casing. The pivot pin merely serves to hold the cap from rising from its bearing.

Inside the front part of the cover 20 is a snuffer proper comprising a tubular part 54 with a flange at its upper end secured to the top wall portion 49 at its underside, and a second tubular part 55 slidably mounted in part 54 and pressed downwardly by a spring 56 to surround the upper end of the wick 24 and engage the head 26 of the wick tube 23, thus extinguishing the flame. The tubular member 55 is of smaller external diameter than the internal diameter of part 54.

The guiding of part 55 may be attained by passing the tube 55 through a corresponding opening provided by an internal flange 57 at the lower part of tubular part 54 and an external flange 58 projecting outwardly from the tubular part 55 above the flange 57. The tubular part 55 is placed in the part 54 from above and is urged downwardly by said helical spring 56 which is interposed between said front top wall portion 49 and said flange 58 and serves to bring flange 58 to rest against flange 57. Such contact will exist when the cover is open. As the cover is moved to closed position the snuffer tube moves into engagement with head 26 of the wick tube and during the final closing movement of the cover said spring 56 is compressed. The engaging surface at the top of the wick tube 23 and the bottom of tube 55 are shown as inclined to increase the effectiveness of the snuffing action.

The completed lighter includes a number of devices mounted on the pivot pin 17 between the arms 15 projecting from the top of the feed tank 10. One of these devices is a centrally looped helical spring 59 surrounding the pivot pin 17, one end of the spring extending forwardly below said pivot pin to engage a fixed part such as the forward edge of one of the arms 15 and the other end extending forwardly above the pivot pin and engaging the cover from below. The arrangement is such that closing the cover stresses the spring and upon unlatching the cover, the spring will act to open the same.

Also mounted on pivot pin 17 is a flint wheel 60 which has a knurled or roughened cylindrical surface 61. The end face of the flint wheel remote from the spring has one-way teeth 62 cut therein. Mounted on said pivot pin 17 between said teeth 62 and the adjacent arm 15 is a metal washer 64 which is radially split at 65 and is bent toward said teeth 62 at one side of said slit to provide an actuating edge or tooth 66 to engage teeth 62. For actuation by the cover 20, said washer has a circular arc edge portion 67 of such a radius that it can be received within said curved rear portion 50 of the cover and at each end of said edge portion 67 are shoulders 68 and 69 resulting from an increase in radius of said washer beyond said points. The remaining edge portion 70′ extending from shoulder to shoulder may be curved according to such increased radius. The shoulder 68 abuts the under side of the V-shaped depression 51 and the shoulder 69 abuts the rear edge of said curved top wall portion 50, whereby the washer 64 will be constrained to move with the cover so that opening of the cover will throw the flint wheel 60.

An important feature resides in the ease of assembly and of disassembly. The fuel tank 10 with the wick tube 23 and the flint tube 27 placed therein constitute a sub-assembly on which the outer casing 30 and the intermediate casing 35 are assembled to form a casing assembly. The cover 20 may be placed on the intermediate casing 35 in its open or raised position with the arcuate edges 47 of the rear ends of said side walls 44 seated on the arcuate edge portions 42 of the sides of the intermediate casing 35.

Figure 4:
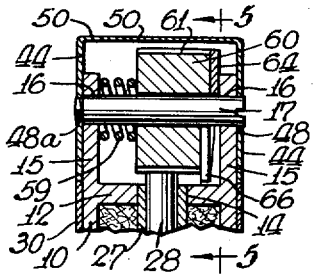
Fig. 4 is a vertical section along the line 4—4 of Fig. 1.
Figure 5:
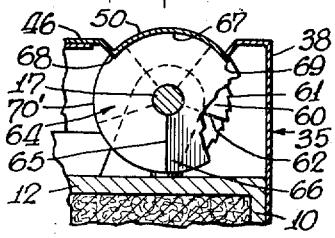
Fig. 5 is a vertical section taken along the line 5—5 of Fig. 4.

The pivot pin 17 is inserted from the right through opening 48 of the cover, through the opening 16 in the adjacent arm 15 of the fuel tank, through the member or washer 64, through the flint wheel 60, the loop of spring 59, the left arm 15, and the threaded reduced end of the pin screwed into the opening 48a in the left side 44 of the cover, as indicated in Fig. 4. In the final assembly one end of the spring 59 extends forwardly over said pivot pin 17 and engages the top wall 46 of the cover from below, preferably beneath the V-shaped depression 51, and the other end of the spring extends forwardly beneath the pivot and engages a fixed part preferably the left arm 15 of the fuel tank by means of its off-turned end.

Figures 6, 7:
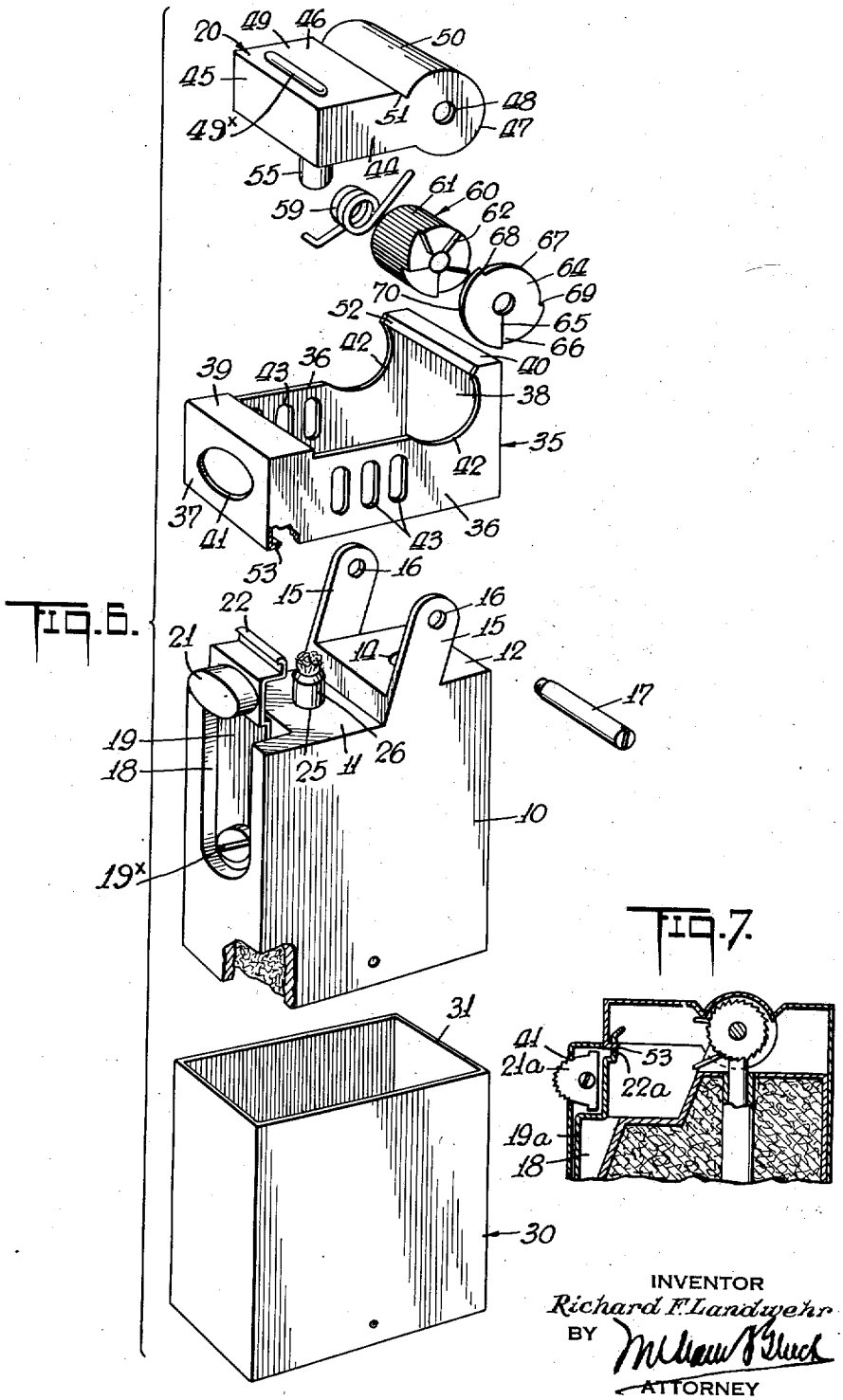
Fig. 6 is a view showing the parts of the lighter in exploded arrangement.
Fig. 7 is a fragmentary section illustrating a modified latching means for the cover.

In Fig. 7, there are disclosures of a modified latch 19a and a modified operating device 21a. The latch element 53 on the cover may be the same as in the first form but the latch 19a has an opening 22a in its upper end to receive said element 53. Opposite the opening in the front of the intermediate casing, the corresponding part of the latch is much farther to the rear than in the first form and at this point inside the casing is pivoted the operating device 21a in the form of a rocking member with a flat part engaging the adjacent portion of the latch. At its front the rocking member or finger piece 21a is roughened or knurled so that it can easily be rocked in either direction to release the latch.

It will be understood that the embodiments shown in the drawings are merely by way of exemplification and that changes may be made therein without departing from the scope and spirit of my invention.

What I claim as new and desire to secure by Letters Patent is:

[1. In a lighter, a fuel tank with a front top wall portion having a hole therein and a higher rear top wall portion with a hole therein, arms projecting upwardly and rearwardly fom the side walls of said tank and having holes therein aligned along an axis vertically above the second mentioned hole, a wick tube extending through the first hole and having a head resting on said front top wall portion, a flint holder in the second hole, a casing telescoped over the top of said tanks and having a front bridge piece and a higher rear bridge piece, the side walls of said casing having in their rear top edges circular arc portions about the axis through the holes in the arms, a top having at rear ends of its side walls circular arc ends fitting in said circular arc portions of the casing and having holes in the part circular ends in alignment with the holes in the arms, a pivot pin through said pairs of holes, spring means urging the cover upwardly, a latch for the forward end of the cover, a flint wheel on said pivot pin, cover-operated means for throwing the flint wheel, and a telescoping snuffer projecting downwardly from the cover to engage said head of the wick tube.]

[2. In a lighter, a fuel tank having front, back, side and top walls, a wick tube extending upwardly through said top wall, arms extending upwardly from the top of the side walls and having openings therein in transverse registration at a level above said top wall to define the axis of rotation for the snuffer cap, a supplemental casing having side and end walls engaged about and telescoped over the upper end of the fuel tank and extending above the top wall thereof and overlying said arms, the upper edges of the side walls of the supplemental casing having a portion thereof curved concavely to a radius about said axis to receive the snuffer cap and a snuffer cap having side walls whose rear portions are curved concavely to the same radius as aforementioned for seating in said concavely curved portion formed in the supplemental casing, said side walls of the cap having openings, in registration with the openings in the arms, and a pivot pin received in said registering openings and about which the snuffer cap is swung from open to closed position.]

[3. In a lighter, a fuel tank having front, back, side and top walls, a wick tube extending upwardly through said top wall, arms extending upwardly from the top of the side walls and having openings therein in transverse registration, at a level above the top wall of the fuel tank to define the axis of rotation for the snuffer cap, a supplemental casing having side and end walls engaged about the upper end of the fuel tank and extending above the top wall thereof and overlying said arms, the upper edges of the side walls of the supplemental casing having a portion thereof curved concavely to a radius about said axis to receive the snuffer cap and a snuffer cap having its rear portion formed cylindrically to seat in said concavely curved portion of the supplemental casing, said side walls of the cap having openings in registration with the openings in the arms, and a pivot pin received in said registering openings in the snuffer cap and arms.]

[4. The combination according to claim 3 wherein the rear and front ends of the supplemental casing are provided with transverse bridge pieces which foreshorten the opening in through the top of the supplemental casing, said snuffer cap extending between the bridge pieces and being thus foreshortened with relation to the corresponding dimension of both the fuel tank and the supplemental casing.]

*5. In a lighter of the type comprising a hollow body having side and end walls, the rear end wall being of a height greater than the said side walls, and the latter walls adjacent said end walls being each provided with a substantially semi-circular cut-out, a pair of ears extending upwardly above the side walls of said body and disposed at said rear cut-outs of the side walls, and a cover pivotally mounted on said ears, the rear end of said cover having side walls each substantially circular to conform to the curvature of the cut-outs of the side walls of the hollow body, that improvement characterized by a foreshortened cover having its said rear end disposed inwardly from the rear wall of said body and its front end disposed inwardly from the front wall of said body, said body being provided with a rear bridge-piece at said higher rear end wall and extending to said rear wall of the foreshortened cover, and a front bridge-piece extending to said front end of the cover, and a fuel tank, said pair of ears extending upward above the top of said tank.*

*6. The improvement according to claim 5 wherein the upper portion of said hollow body including said rear and front bridge-pieces is in the form of a supplemental casing, the lower portions of said supplemental casing telescoping over the upper portion of said tank.*

*7. In the type of lighter defined in claim 5 further provided with latch means for said cover, a flint tube disposed at the rear portion of said body and a wick tube disposed at the front portion of the body, the improvement according to claim 5 wherein the top of said fuel tank is stepped between said flint and wick tubes to provide a rear elevated portion and a front depressed portion whereby the upper end of the flint tube is higher than that of the wick tube and whereby said depressed front portion provides space for said latching means.*

*8. In the type of lighter defined in claim 5 wherein said rear circular ends of the side walls of the cover are mounted on said pair of ears by a pivot located at the center point of said circular cut-outs of the side walls of the body and said rear circular ends of the side walls of the cover, further provided with a flint tube of appreciable thickness disposed on a neutral axis through said pivot, the improvement according to claim 5 wherein said cover is provided with an arcuate top wall at said circular ends of the cover side walls, the rear edge of which cooperates with the front edge of said rear bridge-piece to completely close the lighter when the cover is horizontal, said front edge of the rear bridge-piece subtending an obtuse angle with the axis of the flint tube whereby when the cover is vertical, said rear edge of the arcuate cover top will not contact said flint tube.*

*9. The improvement according to claim 8 wherein, when said cover is in said horizontal position, said arcuate top wall of the cover is disposed substantially horizontally in overlying re-* file of this patent or the original patent:

RICHARD F. LANDWEHR.

REFERENCES CITED

The following references are of record in the file of this patent or the original patent:

UNITED STATES PATENTS

| Number | Name | Date |
|---|---|---|
| 983,238 | Kellermann | Jan. 31, 1911 |
| 1,028,462 | Heyman | June 4, 1912 |
| 1,060,150 | Adamian | Apr. 29, 1913 |
| 1,086,175 | Hofmann | Feb. 3, 1914 |
| 1,487,995 | Wilkins | Mar. 25, 1924 |
| 2,234,768 | Maltner | Mar. 11, 1941 |

FOREIGN PATENTS

| Number | Country | Date |
|---|---|---|
| 47,128 | Austria | Mar. 27, 1911 |
| 356,962 | Great Britain | Sept. 17, 1931 |
| 699,213 | Germany | Nov. 25, 1940 |